United States Patent
Esseghir et al.

(10) Patent No.: US 9,595,365 B2
(45) Date of Patent: Mar. 14, 2017

(54) THERMOPLASTIC, SEMICONDUCTIVE COMPOSITIONS

(71) Applicant: Dow Global Technologies LLC, Midland, MI (US)

(72) Inventors: Mohamed Esseghir, Lawrenceville, NJ (US); Jeffrey M. Cogen, Flemington, NJ (US); Saurav S. Sengupta, Collegeville, PA (US); Neil W. Dunchus, Kinnelon, NJ (US)

(73) Assignee: Dow Global Technologies LLC, Midland, MI (US)

( * ) Notice: Subject to any disclaimer, the term of this patent is extended or adjusted under 35 U.S.C. 154(b) by 330 days.

(21) Appl. No.: 14/374,112

(22) PCT Filed: Jan. 29, 2013

(86) PCT No.: PCT/US2013/023588
§ 371 (c)(1),
(2) Date: Jul. 23, 2014

(87) PCT Pub. No.: WO2013/116196
PCT Pub. Date: Aug. 8, 2013

(65) Prior Publication Data
US 2015/0200038 A1 Jul. 16, 2015

Related U.S. Application Data

(60) Provisional application No. 61/592,700, filed on Jan. 31, 2012.

(51) Int. Cl.
*H01B 1/24* (2006.01)
*C08L 101/10* (2006.01)

(52) U.S. Cl.
CPC .............. *H01B 1/24* (2013.01); *C08L 101/10* (2013.01)

(58) Field of Classification Search
CPC ....................................................... H01B 1/24
See application file for complete search history.

(56) References Cited

U.S. PATENT DOCUMENTS

| | | |
|---|---|---|
| 3,646,155 A | 2/1972 | Scott |
| 4,144,202 A | 3/1979 | Ashcraft et al. |
| 5,064,802 A | 11/1991 | Stevens et al. |
| 5,246,783 A | 9/1993 | Spenadel et al. |
| 5,266,627 A | 11/1993 | Meverden et al. |
| 5,272,236 A | 12/1993 | Lai et al. |
| 5,278,272 A | 1/1994 | Lai et al. |
| 5,824,718 A | 10/1998 | Penfold et al. |
| 5,986,028 A | 11/1999 | Lai et al. |
| 6,048,935 A | 4/2000 | Penfold et al. |
| 6,080,810 A | 6/2000 | Ribarits et al. |
| 6,455,771 B1 | 9/2002 | Han et al. |
| 6,496,629 B2 | 12/2002 | Ma et al. |
| 6,714,707 B2 | 3/2004 | Rossi et al. |
| 6,796,820 B2 | 9/2004 | Jazowski et al. |
| 6,905,356 B2 | 6/2005 | Jazowski et al. |
| 2010/0159206 A1 | 6/2010 | Esseghir et al. |

FOREIGN PATENT DOCUMENTS

| | | |
|---|---|---|
| EP | 1916673 A1 | 4/2008 |
| JP | S51132484 A | 11/1976 |
| WO | 93/19104 A1 | 9/1993 |
| WO | 95/00526 A1 | 1/1995 |
| WO | 95/14024 A1 | 5/1995 |
| WO | 98/49212 A1 | 11/1998 |
| WO | 2011/034833 A1 | 3/2011 |
| WO | 2011/034836 A1 | 3/2011 |
| WO | 2011/034838 A1 | 3/2011 |

*Primary Examiner* — Larry Thrower
(74) *Attorney, Agent, or Firm* — Husch Blackwell LLP

(57) ABSTRACT

Crosslinkable, semiconductive, peroxide-free thermoplastic compositions having a stable volume resistivity of less than 1000 ohm-cm comprise, based on the weight of the composition:
A. 60-90 wt % silane-functionalized polyethylene;
B. 0.5-20 wt % organopolysiloxane containing two or more functional end groups;
C. 10-20 wt % high conductivity carbon black, e.g., a carbon black having an average particle size of 50 nm or less, a surface area (BET) of 700-1250 $m^2/g$, and an oil absorption (DBP) of 300-500 ml/100 g; and
D. 0.05-0.2 wt % crosslinking catalyst.

9 Claims, No Drawings

THERMOPLASTIC, SEMICONDUCTIVE COMPOSITIONS

BACKGROUND OF THE INVENTION

1. Field of the Invention

In one aspect the invention relates to semiconductive, crosslinkable, thermoplastic compositions while in another aspect, the invention relates to the use of these compositions in a process to make semiconductive, crosslinked articles under ambient conditions and without the use of peroxides.

2. Description of the Related Art

Existing technologies for manufacturing crosslinked articles from thermoplastic compositions rely mostly on peroxide-based compounds. Depending whether the article being made is molded or extruded, the manufacturing methods differ. For example, for a molded article, typically, the crosslinkable, thermoplastic compositions are first shaped into a tape or a strip, fed into a rubber injection press for melt-shaping, and finally cured in a hot mold at about 175° C. for 5 to 15 minutes (depending on, among other things, the formulation of the composition and the thickness of the article). For an extruded cable, the crosslinkable, thermoplastic compositions are fed to an extruder and co-extruded along with the insulation compound on a metal conductor, then passed through a high temperature continuous vulcanization tube (CV) to induce cross-linking. In either case, the peroxide cure initiator can be pre-incorporated or admixed with the crosslinkable thermoplastic composition at any time in the process. Scorch, i.e., premature crosslinking, is a common problem of this technology.

In cable manufacture, the process is slow, primarily driven by the limitation in achieving adequate cure across the cable thickness, especially the inner semi-conductive shield. Other technology used in cable manufacture relies on moisture cure where the cable is immersed in a hot water or a sauna to induce cross-linking. In this case a severe limitation exists on moisture diffusion to the inner most layer of the cable, i.e. the conductor shield, thus requiring long cure times. Thus the limitations of current moisture cure techniques to small size cables.

SUMMARY OF THE INVENTION

In one embodiment the invention is a crosslinkable, semiconductive, peroxide-free thermoplastic composition having a stable volume resistivity of less than 1000 ohm-cm at 90° C. comprising, based on the weight of the composition:
A. 60-90 wt % silane-functionalized polyethylene;
B. 0.5-20 wt % organopolysiloxane containing two or more functional end groups;
C. 10-20 wt % carbon black; and
D. 0.05-0.2 wt % crosslinking catalyst.

In one embodiment the invention is a process for making a crosslinked, semiconductive, thermoplastic article having a stable volume resistivity of less than 1000 ohm-cm at 90° C., the process comprising the steps of:
A. Combining a silane-functionalized polyethylene with an organopolysiloxane containing two or more functional end groups to form a crosslinkable compound;
B. Combining under ambient conditions (1) the crosslinkable compound of (A) with, (2) carbon black to form a first mixture comprising 80-90 wt % of the crosslinkable compound of (A) and 10-20 wt % of the carbon black, based on the weight of the first mixture;
C. Combining the first mixture with 0.05-0.2 wt % of a crosslinking catalyst to form a homogeneous second mixture;
D. Shaping the second mixture under non-crosslinking conditions into a crosslinkable, semiconductive, thermoplastic article; and
E. Subjecting the shaped, crosslinkable, semiconductive, thermoplastic article to crosslinking conditions.

In one embodiment the process comprises the additional steps of (a) making the silane-functionalized polyethylene by grafting a polyethylene with a silane compound under grafting conditions, and (b) pelletizing the crosslinkable compound of (A) before mixing it with the organopolysiloxane. In one embodiment the process comprises the additional steps of (a) making the silane-functionalized polyethylene by copolymerizing ethylene with a vinyl silane under copolymerization conditions, and (b) pelletizing the crosslinkable compound of (A) before mixing it with the organopolysiloxane.

In one embodiment the process comprises the steps of (a) making a silane-functionalized polyethylene by grafting a polyethylene with a silane compound under grafting conditions; (b) mixing the silane-functionalized polyethylene with an organopolysiloxane; (c) mixing conductive filler, such as carbon black, with the mixture formed in step (b), and (d) recovering and pelletizing the mixture formed in step (c). All steps are performed in a single vessel, i.e., the process is an in-line process.

In one embodiment the invention is a pellet free of crosslinking catalyst, the pellet comprising:
A. 60-90 wt % silane-functionalized polyethylene;
B. 0.5-20 wt % organopolysiloxane containing two or more functional end groups; and
C. 10-20 wt % high conductivity carbon black.

Free of crosslinking catalyst means that a catalyst capable of crosslinking the composition of the pellet under process conditions, e.g., 23° C. and atmospheric pressure, is not added at any stage of the process.

DETAILED DESCRIPTION OF THE PREFERRED EMBODIMENT

Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the component amounts of the composition and various process parameters.

"Cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a compound prepared by reacting (i.e., polymerizing) monomers, whether of the same or a different type. The generic term polymer thus embraces the term "homopolymer", usually employed to refer to polymers prepared from only one type of monomer, and the term "interpolymer" as defined below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Ethylene polymer", "polyethylene" and like terms mean a polymer containing units derived from ethylene. Ethylene polymers typically comprise at least 50 mole percent (mol %) units derived from ethylene.

"Ethylene-vinylsilane polymer" and like terms mean an ethylene polymer comprising silane functionality. The silane functionality can be the result of either polymerizing ethylene with a vinyl silane, e.g., a vinyl trialkoxy silane comonomer, or, grafting such a comonomer onto an ethylene polymer backbone as described, for example, in U.S. Pat. No. 3,646,155 or U.S. Pat. No. 6,048,935.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition" and like terms mean a mixture or blend of two or more components. For example, in the context of preparing a silane-grafted ethylene polymer, a composition would include at least one ethylene polymer, at least one vinyl silane, and at least one free radical initiator. In the context of preparing a cable sheath or other article of manufacture, a composition would include an ethylene-vinylsilane copolymer, a catalyst cure system and any desired additives such as lubricants, fillers, anti-oxidants and the like.

"Ambient conditions" and like terms means temperature, pressure and humidity of the surrounding area or environment of an article. The ambient conditions of a typical laboratory or production facility include a temperature of 23° C. and atmospheric pressure.

"Catalytic amount" means an amount of catalyst necessary to promote the crosslinking of an ethylene-vinylsilane polymer at a detectable level, preferably at a commercially acceptable level.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause or promote substantial crosslinking upon subjection or exposure to such treatment (e.g., exposure to water).

"Melt-shaped" and like terms refer to an article made from a thermoplastic composition that has acquired a configuration as a result of processing in a mold or through a die while in a melted state. The melt-shaped article may be at least partially crosslinked to maintain the integrity of its configuration. Melt-shaped articles include wire and cable sheaths, compression and injection molded parts, sheets, tapes, ribbons and the like.

"Peroxide-free" and like terms mean that the amount of peroxide present in the crosslinkable, semiconductive, thermoplastic compositions and articles of this invention does not exceed the amount, if any, of residual peroxide remaining from the grafting of a silane functionality to the polyethylene. Typically this amount is less than 300 parts per million (ppm), preferably less than 100 ppm. Other than for grafting silane functionality to polyethylene, peroxide is not added to the compositions and articles of this invention.

"Stable volume resistivity" and like terms mean a volume resistivity in ohm-cm of a crosslinked composition or article that does not change by more than 30%, preferably by not more than 20% and even more preferably by not more than 10%, after an oven aging period of 15 days at 90° C.

"Pellet" and like terms mean small particles typically created by compressing a powder or granular material, or by chopping strands created during extrusion of a melt through a die. Pellet shapes and sizes can vary widely.

Ethylene Polymers

The polyethylenes used in the practice of this invention, i.e., the polyethylenes that contain copolymerized silane functionality or are subsequently grafted with a silane, can be produced using conventional polyethylene polymerization technology, e.g., high-pressure, Ziegler-Natta, metallocene or constrained geometry catalysis. In one embodiment, the polyethylene is made using a high pressure process. In another embodiment, the polyethylene is made using a mono- or bis-cyclopentadienyl, indenyl, or fluorenyl transition metal (preferably Group 4) catalysts or constrained geometry catalysts (CGC) in combination with an activator, in a solution, slurry, or gas phase polymerization process. The catalyst is preferably mono-cyclopentadienyl, mono-indenyl or mono-fluorenyl CGC. The solution process is preferred. U.S. Pat. No. 5,064,802, WO93/19104 and WO95/00526 disclose constrained geometry metal complexes and methods for their preparation. Variously substituted indenyl containing metal complexes are taught in WO95/14024 and WO98/49212.

In general, polymerization can be accomplished at conditions well-known in the art for Ziegler-Natta or Kaminsky-Sinn type polymerization reactions, that is, at temperatures from 0-250° C., preferably 30-200° C., and pressures from atmospheric to 10,000 atmospheres (1013 megaPascal (MPa)). Suspension, solution, slurry, gas phase, solid state powder polymerization or other process conditions may be employed if desired. The catalyst can be supported or unsupported, and the composition of the support can vary widely. Silica, alumina or a polymer (especially poly(tetrafluoroethylene) or a polyolefin) are representative supports, and desirably a support is employed when the catalyst is used in a gas phase polymerization process. The support is preferably employed in an amount sufficient to provide a weight ratio of catalyst (based on metal) to support within a range of from 1:100,000 to 1:10, more preferably from 1:50,000 to 1:20, and most preferably from 1:10,000 to 1:30. In most polymerization reactions, the molar ratio of catalyst to polymerizable compounds employed is from 10-12:1 to 10-1:1, more preferably from $10^{-9}:1$ to $10^{-5}:1$.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene.

The ethylene polymers useful in the practice of this invention include ethylene/α-olefin interpolymers having a α-olefin content of at least 15, preferably at least 20 and even more preferably at least 25, wt % based on the weight of the interpolymer. These interpolymers typically have an α-olefin content of less than 50, preferably less than 45, more preferably less than 40 and even more preferably less than 35, wt % based on the weight of the interpolymer. The α-olefin content is measured by $^{13}$C nuclear magnetic resonance (NMR) spectroscopy using the procedure described in Randall (*Rev. Macromol. Chem. Phys.*, C29 (2&3)). Generally, the greater the α-olefin content of the interpolymer, the lower the density and the more amorphous the interpolymer, and this translates into desirable physical and chemical properties for the protective insulation layer.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethylene polymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

The ethylene polymers used in the practice of this invention can be used alone or in combination with one or more other ethylene polymers, e.g., a blend of two or more ethylene polymers that differ from one another by monomer composition and content, catalytic method of preparation, etc. If the ethylene polymer is a blend of two or more ethylene polymers, then the ethylene polymer can be blended by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts.

Examples of ethylene polymers made with high pressure processes include (but are not limited to) low density polyethylene (LDPE), ethylene silane reactor copolymer (such as SiLINK® made by The Dow Chemical Company), ethylene vinyl acetate copolymer (EVA), ethylene ethyl acrylate copolymer (EEA), and ethylene silane acrylate terpolymers.

Examples of ethylene polymers that can be grafted with silane functionality include very low density polyethylene (VLDPE) (e.g., FLEXOMER® ethylene/1-hexene polyethylene made by The Dow Chemical Company), homogeneously branched, linear ethylene/α-olefin copolymers (e.g., TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and ethylene block copolymers (e.g., INFUSE® polyethylene available from The Dow Chemical Company). The more preferred ethylene polymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

Silane Functionality

Any silane that will effectively copolymerize with ethylene, or graft to and crosslink an ethylene polymer, can be used in the practice of this invention, and those described by the following formula are exemplary:

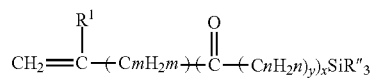

in which $R^1$ is a hydrogen atom or methyl group; x and y are 0 or 1 with the proviso that when x is 1, y is 1; m and n are independently an integer from 0 to 12 inclusive, preferably 0 to 4, and each R″ independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl. Such silanes may be copolymerized with ethylene in a reactor, such as a high pressure process. Such silanes may also be grafted to a suitable ethylene polymer by the use of a suitable quantity of organic peroxide, either before or during a shaping or molding operation. Additional ingredients such as heat and light stabilizers, pigments, etc., also may be included in the formulation. The phase of the process during which the crosslinks are created is commonly referred to as the "cure phase" and the process itself is commonly referred to as "curing". Also included are silanes that add to unsaturation in the polymer via free radical processes such as mercaptopropyl trialkoxysilane.

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth)acryloxy propyl trimethoxy silane and mixtures of these silanes are the preferred silane crosslinkers for use in this invention. If filler is present, then preferably the crosslinker includes vinyl trialkoxy silane.

The amount of silane crosslinker used in the practice of this invention can vary widely depending upon the nature of the polymer, the silane, the processing or reactor conditions, the grafting or copolymerization efficiency, the ultimate application, and similar factors, but typically at least 0.5, preferably at least 0.7, weight percent is used. Considerations of convenience and economy are two of the principal limitations on the maximum amount of silane crosslinker used in the practice of this invention, and typically the maximum amount of silane crosslinker does not exceed 5, preferably it does not exceed 3, weight percent.

The silane crosslinker is grafted to the polymer by any conventional method, typically in the presence of a free radical initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.01, preferably at least 0.03, parts per hundred resin (phr). Typically, the initiator does not exceed 0.15, preferably it does not exceed about 0.10, phr. The weight ratio of silane crosslinker to initiator also can vary widely, but the typical crosslinker:initiator weight ratio is between 10:1 to 500:1, preferably between 18:1 and 250:1. As used in parts per hundred resin or phr, "resin" means the olefinic polymer.

While any conventional method can be used to graft the silane crosslinker to the polyolefin polymer, one preferred method is blending the two with the initiator in the first stage of a reactor extruder, such as a Buss kneader. The grafting conditions can vary, but the melt temperatures are typically between 160 and 260° C., preferably between 190 and 230° C., depending upon the residence time and the half life of the initiator.

Copolymerization of vinyl trialkoxysilane crosslinkers with ethylene and other monomers may be done in a high-pressure reactor that is used in the manufacture of ethylene homopolymers and copolymers with vinyl acetate and acrylates.

Polyfunctional Organopolysiloxane with Functional End Groups

The oligomers containing functional end groups useful in the present process comprise from 2 to 100,000 or more units of the formula R$_2$SiO in which each R is independently selected from a group consisting of alkyl radicals comprising one to 12 carbon atoms, alkenyl radicals comprising two to 12 carbon atoms, aryls, and fluorine substituted alkyl radicals comprising one to 12 carbon atoms. The radical R can be, for example, methyl, ethyl, n-propyl, isopropyl, n-butyl, sec-butyl, dodecyl, vinyl, allyl, phenyl, naphthyl, tolyl, and 3,3,3-trifluoropropyl. Preferred is when each radical R is methyl.

In one embodiment, the organopolysiloxane containing one or more functional end groups is a hydroxyl-terminated polydimethylsiloxane containing at least two hydroxyl end groups. Such polydimethylsiloxanes are commercially available, for example as silanol-terminated polydimethylsiloxane from Gelest, Inc. However, polydimethylsiloxanes having other terminal groups that can react with grafted silanes may be used e.g. polydimethylsiloxanes with amine end groups and the like. In preferred embodiments, the polydimethylsiloxane is of the formula

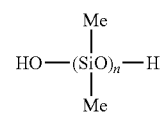

in which Me is methyl and n is in the range of 2 to 100,000 or more, preferably in the range of 10 to 400 and more preferably in the range of 20 to 120. Examples of suitable polyfunctional organopolysiloxanes are the silanol-terminated polydimethylsiloxane DMS-15 (Mn of 2,000-3,500, viscosity of 45-85 centistokes, —OH level of 0.9-1.2%) from Gelest Corp., and Silanol Fluid 1-3563 (viscosity 55-90 centistokes, —OH level of 1-1.7%) from Dow Corning Corp. In some embodiments the polyfunctional organopolysiloxane comprises branches such as those imparted by Me-SiO$_{3/2}$ or SiO$_{4/2}$ groups (known as T or Q groups to those skilled in silicone chemistry).

The amount of polyfunctional organopolysiloxane used in the practice of this invention can vary widely depending upon the nature of the polymer, the silane, the polyfunctional organopolysiloxane, the processing or reactor conditions, the ultimate application, and similar factors, but typically at least 0.5, preferably at least 2, weight percent is used. Considerations of convenience and economy are two of the principal limitations on the maximum amount of polyfunctional organopolysiloxane used in the practice of this invention, and typically the maximum amount of polyfunctional organopolysiloxane does not exceed 20, preferably it does not exceed 10, weight percent.

Catalyst

Useful crosslinking catalysts include the Lewis and Brønsted acids and bases. Lewis acids are chemical species that can accept an electron pair from a Lewis base. Lewis bases are chemical species that can donate an electron pair to a Lewis acid. Lewis acids that can be used in the practice of this invention include the tin carboxylates such as dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. DBTDL is a preferred Lewis acid. Lewis bases that can be used in the practice of this invention include, but are not limited to, the primary, secondary and tertiary amines. These catalysts are typically used in moisture cure applications.

Brønsted acids are chemical species that can lose or donate a hydrogen ion (proton) to a Brønsted base. Brønsted bases are chemical species that can gain or accept a hydrogen ion from a Brønsted acid. Brønsted acids that can be used in the practice of this invention include sulfonic acid.

The minimum amount of crosslinking catalyst used in the practice of this invention is a catalytic amount. Typically this amount is at least 0.01, preferably at least 0.02 and more preferably at least 0.03, weight percent (wt %) of the combined weight of ethylene-vinylsilane polymer and catalyst. The only limit on the maximum amount of crosslinking catalyst in the ethylene polymer is that imposed by economics and practicality (e.g., diminishing returns), but typically a general maximum comprises less than 5, preferably less than 3 and more preferably less than 2, wt % of the combined weight of ethylene polymer and condensation catalyst.

Carbon Black

In manufacturing semi-conductive compounds, a sufficient amount of conductive filler must be incorporated into the polymer matrix in order to achieve the desired, stable conductivity. In wire and cable applications the desired conductivity (as measured by volume resistivity) is usually below 1000 ohm-cm, preferably below 500 ohm-cm, and more preferably below 250 ohm-cm. The minimum amount of conductive filler to achieve the target volume resistivity is referred to as the percolation threshold. This percolation threshold is the amount of conductive filler below which the volume resistivity increases drastically, and above which the volume resistivity is not lowered substantially by the addition of more conductive filler, and any such increased addition would negatively impact the processability of the compound. For wire and cable semi-conductive compounds, the percolation threshold is in the range of 28-38 weight percent (wt %) when using typical conductive carbon blacks such as acetylene black (e.g. Denka), or Vulcan XC-500 (Cabot Corp.). With conventional moisture cure, such high levels of carbon black present a number of challenges including scorch, processability issues and reduced compound flexibility.

To mitigate such problems and to provide in an even faster cure system under ambient conditions, e.g., 23° C. and atmospheric pressure, the preferred conductive fillers used in the practice of this invention are high conductivity carbon blacks, i.e. those carbon blacks that do not require a high level loading, e.g., 28 or more wt % based on the weight of the composition, to achieve the percolation threshold, and thus mitigates such challenges. An example of such conductive carbon black is AKZO Ketjenblack EC300J. This and other preferred carbon blacks do not require the high loadings of conventional carbon blacks, and thus do not exacerbate moisture amounts brought into the composition or compromise processability and product properties. Representative high conductive carbon blacks have an average particle size of 50, preferably 40, nanometers (nm) or less, a surface area (BET) of 500 to 1250, preferably 600 to 900, $m^2/g$, and an oil absorption (dibutyl phthalate or DBP) of 200 to 600, preferably 300 to 500 ml/100 g, For example, AKZO Ketjenblack EC300J has a particle size of about 35 nm or less, a surface area (BET) of about 750 to 850 $m^2/g$, and an oil absorption of about 300 to 400 ml/100 g.

The high conductivity carbon blacks used in the practice of this invention can be used either alone or in combination with one another. Whether alone or in combination with other suitable carbon blacks, they are used in an amount of 10 to 25%, preferably 12 to 20% and more preferably 13 to 18% by weight based on total composition of the semi-conductive compound. Amounts of less than 12 wt % may lead to compounds with unstable conductivity under heat aging. Compound using more than 20 wt % can result in materials with increased stiffness (as defined by tensile modulus M100). However; lesser or greater amounts may be used if a process or formulation approach can be employed to offset for the lesser or greater than loading, e.g., double pass mixing to improve dispersion for the lower limit, and use of higher flexibility base polymers along with addition of suitable plasticizers to impart flexibility for the higher filler limit.

Fillers and Additives

The composition from which the crosslinked article, e.g., cable insulation layer or protective jacket, injection molded elastomeric connector, etc., or other article of manufacture, e.g., seal, gasket, shoe sole, etc., is made can be filled or unfilled. If filled, then the amount of filler present should preferably not exceed an amount that would cause unacceptably large degradation of the electrical and/or mechanical properties of the silane-crosslinked, ethylene polymer.

For purposes of this invention, filler does not include the conductive carbon blacks described above. If filler is used, it is typically a conductive material, e.g., metal particulate, or a reinforcing material, e.g., silica, talc, etc. If present, then it is typically present in an amount of 5 and 25, preferably of 10 and 20, wt % based on the weight of the composition. Representative fillers include kaolin clay, magnesium hydroxide, silica, calcium carbonate, carbon blacks other than the conductive carbon blacks described above, and elastomeric polymers such as EPDM and EPR. The filler may or may not have flame retardant properties. In a one embodiment of this invention in which filler is present, the filler is coated with a material that will prevent or retard any tendency that the filler might otherwise have to interfere with the silane cure reaction. Stearic acid is illustrative of such a filler coating. Filler and catalyst are selected to avoid any undesired interactions and reactions, and this selection is well within the skill of the ordinary artisan.

The compositions of this invention can also contain additives such as, for example, antioxidants (e.g., hindered phenols such as, for example, IRGANOX™ 1010 a registered trademark of Ciba Specialty Chemicals), phosphites (e.g., IRGAFOS™ 168 a registered trademark of Ciba Specialty Chemicals), UV stabilizers, heat stabilizers, cure promoters, cling additives, adhesion promoters, light stabilizers (such as hindered amines), plasticizers and/or plasticizer oils (such as dioctylphthalate or epoxidized soy bean oil), scorch inhibitors, mold release agents, tackifiers (such as hydrocarbon tackifiers), waxes (such as polyethylene waxes), processing aids (such as oils, organic acids such as stearic acid, metal salts of organic acids), oil extenders (such as paraffin oil and mineral oil), colorants or pigments to the extent that they do not interfere with desired physical or mechanical properties of the compositions of the present invention. These additives are known in the art and are used in known amounts and in known ways. For example, oils, if present, are typically used in an amount of 5 to 15 wt %, adhesion promoters in an amount of 0.05 to 2 wt %, etc., with the total amount of additives, exclusive of fillers, typically not exceeding 20 wt % of the composition.

Compounding/Fabrication

Compounding of the silane-functionalized ethylene polymer, polyfunctional organopolysiloxane, catalyst, conductive carbon black, and filler and additives, if any, can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The components of the composition are typically mixed at a temperature and for a length of time sufficient to fully homogenize the mixture but insufficient to cause the material to gel. The catalyst is typically added to ethylene-vinylsilane polymer but it can be added before, with or after the additives, if any. In one embodiment the components are mixed together in a melt-mixing device. The mixture is then shaped into the final article. The temperature of compounding and article fabrication should be above the melting point of the ethylene-vinylsilane polymer but below about 250° C.

In one embodiment the olefin elastomer, e.g., ENGAGE or AFFINITY polyethylene as available from The Dow Chemical Company, or EXACT polyethylene as available from ExxonMobil, is grafted with vinyl silane in the presence of peroxide in a compounding operation such as a twin-screw extruder. Hydroxy-terminated siloxane is then added in-line and melt-mixed with the grafted polymer. The resulting compound is then recovered and granulated. The granulated compound is mixed with the conductive carbon black in a second compounding operation, such as in a BANBURY mixer. Additives and/or fillers can be added at this time. The blend or mix of the granulated compound, carbon black and any additives and/or fillers is then mixed with a moisture condensation catalyst, preferably in a masterbatch form for good homogenization and formed into a finished article, such as an injection molding machine. The article will then crosslink under ambient conditions, i.e., without the need for a hot water bath or sauna.

In one embodiment the process of this invention comprises the steps of (a) making a silane-functionalized polyethylene by grafting a polyethylene with a silane compound under grafting conditions; (b) mixing silane-functionalized polyethylene with an organopolysiloxane; (c) mixing conductive filler, such as high conductivity carbon black, and (d) recovering and pelletizing the mixture of (c). Steps (a)-(c) are performed in-line, i.e., in a single vessel thus providing speed and efficiency to the operation. Typically one step is completed or near completed before the initiation of the next step although the degree of overlap between two or more steps can vary widely depending upon the materials and operating conditions of each step. The addition of the crosslinking catalyst is not included in any of these steps. Rather, the crosslinking catalyst is mixed with the pelleted composition at the time the composition is made into an article, e.g., the catalyst is added to the pellets at the time the pellets are added to an extruder for processing into a wire or cable coating, or at the time the pellets are added to a blender or mixer for processing into a molded article.

In some embodiments, either or both of the catalyst and the additives are added as a pre-mixed masterbatch. Such masterbatches are commonly formed by dispersing the catalyst and/or additives into an inert plastic resin, e.g., a low density polyethylene. Masterbatches are conveniently formed by melt compounding methods.

In one embodiment, one or more of the components are dried before compounding, or a mixture of components is dried after compounding, to reduce or eliminate potential scorch that may be caused from moisture present in or associated with the component, e.g., filler. In one embodiment, crosslinkable silane-modified polyolefin mixtures are prepared in the absence of a crosslinking catalyst for extended shelf life, and the crosslinking catalyst is added as a final step in the preparation of a melt-shaped article.

Articles of Manufacture

In one embodiment, the composition of this invention can be applied to a cable as a sheath or insulation layer in known amounts and by known methods (for example, with the equipment and methods described in U.S. Pat. Nos. 5,246,783 and 4,144,202). Typically, the composition is prepared in a reactor-extruder equipped with a cable-coating die and after the components of the composition are formulated, the composition is extruded over the cable as the cable is drawn through the die. Cure may begin in the reactor-extruder.

One of the benefits of this invention is that the shaped article does not require post-shaping, e.g., after de-molding or passing through a shaping die, cure conditions, e.g., temperature above ambient and/or moisture from an external source such as a water bath or sauna. While not necessary or preferred, the shaped article can be exposed to either or both elevated temperature and external moisture and if an elevated temperature, it is typically between ambient and up to but below the melting point of the polymer for a period of time such that the article reaches a desired degree of crosslinking. The temperature of any post-shaping cure should be above 0° C.

Other articles of manufacture that can be prepared from the polymer compositions of this invention include fibers, ribbons, sheets, tapes, tubes, pipes, weather-stripping, seals, gaskets, hoses, foams, footwear and bellows. These articles can be manufactured using known equipment and techniques.

The invention is described more fully through the following examples. Unless otherwise noted, all parts and percentages are by weight.

Specific Embodiments

Comparative Examples CE-1, CE-2 and CE-3

The following examples use standard peroxide-based EPDM compositions which are vulcanized at high temperature. These are representative of the current practice of curing in a hot mold (here simulated by a cure step in a press held at 175° C. for 10 min.

TABLE 1

Peroxide-Based EPDM Compositions and Properties

| Component | Comparative Example 1 (wt %) | Comparative Example 2 (wt %) | Component | Comparative Example 3 (wt %) |
| --- | --- | --- | --- | --- |
| Nordel IP 3430 EPDM | 71.0 | 76.0 | Nordel IP 3430 | 35.00 |
| Akzo ketjenblack Black EC-300J | 17.0 | | Nordel IP-3722P | 15.00 |
| Cabot VXC805 Carbon Black | | 15.0 | XC-500 carbon black | 36.00 |
| Sunpar 2280 Oil | 10.0 | 7.0 | Zinc Oxide | 2.00 |
| Zinc Oxide | 2.0 | 2.0 | Sunpar 2280 (oil) | 12.00 |
| Total | 100.0 | 100.0 | | 100.0 |
| Additional Sunpar Oil in Brabender | | 5.0 | | |

TABLE 1-continued

Peroxide-Based EPDM Compositions and Properties

| Component | Comparative Example 1 (wt %) | Comparative Example 2 (wt %) | Component | Comparative Example 3 (wt %) |
|---|---|---|---|---|
| DCP Peroxide Perkadox 14S FL (added at low temperature in a second step, (wt %) | 2.0 | 2.0 | DCP Peroxide Perkadox 14S FL (added at low temperature in a second step, (wt %) | 2.00 |
| Properties of compression molded plaque cured in press at 750° C. for 10 min | | | | |
| Tensile strength (psi) | 1825 | 1548 | | 1810 |
| Elongation at break (%) | 416 | 404 | | 347 |
| M100 (psi) | 268 | 312 | | 507 |
| Shore A | 65.3 | 64.9 | | 73.3 |
| Tear Strength - Die B (lb/in) | 196.2 | 214.7 | | 249.4 |
| Temperature, ° C. | Volume Resistivity (ohm-cm), day 1 at Room temperature, subsequent days at 90° C. | | | |
| 28.1 | 9.68E+01 | 4.37E+01 | | 1.25E+05 |
| 90.1 | 3.03E+01 | 2.15E+01 | | 1.04E+02 |
| 90.4 | 2.84E+01 | 2.37E+01 | | 1.01E+02 |
| 90.2 | 2.63E+01 | 3.78E+01 | | 1.02E+02 |
| 90 | 2.70E+01 | 2.65E+01 | | 1.06E+02 |

Nordel IP 3430 EPDM: END 0.7%, Mooney viscosity 27, crystallinity <1%, ethylene content 42%, available from The Dow Chemical Company.
Nordel IP 3722P EPDM: ENB 0.5%, Mooney viscosity 18, crystallinity 15%, ethylene content 71%, available from The Dow Chemical Company.
AKZO Ketjenblack Black EC-300J has a particle size of 35 nm or less, a surface area (BET) of 750 to 850 $m^2/g$, iodine absorption of 740-840 ml 100 gram, and an oil absorption (DBP) of 300 to 400 ml/100 g.
Cabot VXC805 Carbon Black, an iodine absorption of 370 to 470 ml/100 g,
XC500 Carbon Black, oil absorption (DBP) of 140 to 155 ml/100 g, and an iodine absorption of 70 to 80 ml/100 g.
SUNPAR 2280 Oil, paraffinic process oil from R. E. Carroll Corp.
Zinc Oxide, stabilizer in cross-linkable elastomeric and rubber compounds such as available from Stuktol Company of America.
Perkadox 14S FL Peroxide, a di(tert-butylperoxyisopropyl)benzene, peroxide flakes available from Akzo Nobel Polymer Chemicals.
Tensile Strength, elongation at break, M100: ASTM D638
Shore A: ASTM D2240
Tear Strength (Die B): ASTM D624
Volume resistivity is measured on specimens taken from 8 × 2 × 0.75 inch plaques prepared by compression molding the compound under thermoplastic conditions. The specimens are cooled to room temperature and removed from the mold. Specimen are coated with a conductive paint, then flattened copper conductors (16 AWG) are wrapped around each plaque at each end of the plaque so that the conductors are 2 inches apart, and each is about 1 inch from a plaque end. The wrapped conductor wire is pressed for good contact with the conductive paint, then the wired specimen is placed in an oven with apparatus to monitor for volume resistivity at specified temperature.
Hot Creep is measured as percent elongation under 20 $N/mm^2$ load in an oven at 150° C. oven for 15 min. A common standard for adequate crosslinking is elongation of less than or equal to (≤) 100%. Measurements are obtained on triplicate samples.
MDR: Crosslinking kinetics are evaluated using a Moving Die Rheometer (MDR), which is set at 100 cycles per minute, and at an arc of 0.5 degrees. The torque data is correlated to the degree of crosslinking, and is obtained as a function of cure time. The MDR chamber is set at a temperature of 177° C. Lowest torque value (ML, in-lb) is reported as indication of viscosity buildup, i.e. ease of processing for each compositions.

Inventive Examples IE1-IE5 and Comparative Example 4

Examples IE1 to IE3 below represent the invention in which a silane-grafted olefin elastomer containing 5% of hydroxyl-terminated polydimethylsiloxane (OH-PDMS) made in a first step in twin-screw extruder, then compounded in a batch mixer with high conductivity carbon blacks, then a dibutyl tin catalyst masterbatch is added during the compounding step. The compound is compression molded in a press at 150° C., cooled and de-molded. The plaques are cured for 3 days at ambient conditions.

The examples show excellent cure, mechanical properties and when using high conductivity carbon blacks (AKZO Ketjenblack EC300 or Cabot VXC805) excellent electrical conductivity is achieved at a low filler loading which results in the desired flexible material (as shown by M100 values).

Also the examples show the loading level required for the desired conductivity. For example with 12% filler, the conductivity is not stable as shown by spikes in volume resistivity (VR) during the aging period. It is also known to those versed in the art that such compounds will require a post compounding drying step to remove excess moisture brought in by the carbon black. These examples illustrate the invention for a semi-conductive compound that can be molded in a thermoplastic fashion, then cured at ambient conditions, thus eliminate the in-mold vulcanization step.

Comparative Example 4 illustrates that proper selection of the conductive filler is needed: Despite much higher loading required (37 wt. %), the VR is not as good as when using a high conductivity carbon blacks, but also resulting in a much stiffer compound as shown by the M100 value, thus compromising flexibility as well as a more viscous system which would present processing difficulties.

TABLE 2

Inventive Peroxide-Free Compositions and Comparative Example 4

| | IE 1 (wt %) | IE2 (wt %) | IE3 (wt %) | IE4 (wt %) | IE5 (wt %) | Comparative Example 4 (wt %) |
|---|---|---|---|---|---|---|
| Modified Ethylene Butene Copolymer | 69.0 | 70.0 | 72.0 | 69.0 | 72.0 | 47.0 |
| Akzo ketjenblack Black EC-300J | 15.0 | 14.0 | 12.0 | | | |
| Cabot VXC805 Carbon Black | | | | 15.0 | 12.0 | |
| Cabot XC500 Carbon Black | | | | | | 37.0 |

TABLE 2-continued

Inventive Peroxide-Free Compositions and Comparative Example 4

| | | | | | | |
|---|---|---|---|---|---|---|
| Zinc Oxide | 2.0 | 2.0 | 2.0 | 2.0 | 2.0 | 2.0 |
| Sunpar 2280 Oil | 10.0 | 10.0 | 10.0 | 10.0 | 10.0 | 10.0 |
| DBTDL Catalyst MB | 4.0 | 4.0 | 4.0 | 4.0 | 4.0 | 4.0 |
| Total | 100.0 | 100.0 | 100.0 | 100.0 | 100.0 | 100.0 |

| | Baseline | Lower CB level | Lower CB level | Potential alternative to EC-300J | Potential alternative to EC-300J | Std conductivity CB |
|---|---|---|---|---|---|---|
| Tensile at Break (psi) | 1168 | 1071 | 956 | 1236 | 1067 | 1312 |
| Tensile Elongation (%) | 386 | 357 | 246 | 399 | 311 | 199 |
| Modulus at 100% Elong. (M100, psi) | 629 | 600 | 679 | 628 | 671 | 1028 |
| Hot Creep (Oven at 150° C., 20N load) | 10.9 | 27.3 | 293 | 18.4 | 26.3 | 10.4 |
| MDR@177° C., 10 min. catalyzed system | | | | | | |
| ML (in-lb) | 0.99 | 0.89 | 0.56 | 2.11 | 1.05 | 2.63 |
| MH (in-lb) | 1.65 | 1.61 | 1.15 | 3.39 | 1.91 | 3.74 |
| ts1 (min) | >10 | >10 | >10 | 5.1 | >10 | 8.5 |

| Volume Resistivity (ohm-cm) - Day 1 at RT, then aged at 90° C. for subsequent days, average readings for two specimen each | | | | | | Oven Temp., ° C. |
|---|---|---|---|---|---|---|
| Day 1 | 90 | 201 | 716 | 31 | 74 | 29 | 24.3 |
| Day 2 | 51 | 138 | 198 | 20 | 242 | 76 | 89.2 |
| Day 3 | 50 | 141 | 213 | 20 | 63 | 190 | 89.1 |
| Day 4 | 50 | 138 | 185 | 19 | 118 | 201 | 89.2 |
| Day 5 | 53 | 257 | 72091 | 21 | 52 | 69 | 89.1 |
| Day 6 | 53 | 237 | 188 | 19 | 48 | 73 | 89.2 |
| Day 7 | 53 | 226 | 185 | 19 | 62 | 68 | 89.2 |
| Day 8 | 53 | 206 | 188 | 19 | 50 | 68 | 89.2 |
| Day 9 | 53 | 198 | 183 | 19 | 59 | 68 | 89.2 |
| Day 10 | 53 | 192 | 182 | 19 | 488 | 69 | 89.2 |
| Day 11 | 51 | 189 | 177 | 19 | 130151 | 72 | 89.2 |
| Day 12 | 52 | 186 | 870 | 19 | 223266 | 67 | 89.2 |
| Day 13 | 53 | 182 | 183 | 19 | 68 | 66 | 89.1 |
| Day 14 | 53 | 179 | 182 | 19 | 449 | 66 | 89.1 |
| Day 15 | 53 | 178 | 174 | 19 | 54 | 65 | 89.2 |
| Day 16 | 55 | 176 | 187 | 19 | 259678 | 65 | 89.2 |

DBTDL is dibutyl tin dilaurate such as FASCAT 4202 from Arkema, Inc.

What is claimed is:

1. A crosslinkable, semiconductive, peroxide-free thermoplastic composition having a stable volume resistivity of less than 1000 ohm-cm at 90° C. comprising, based on the weight of the composition:
    A. 60-90 wt % silane-functionalized polyethylene;
    B. 0.5-20 wt % organopolysiloxane containing two or more functional end groups; and
    C. 10-20 wt % carbon black having an average particle size of 50 nm or less, a surface area (BET) of 700-1250 m$^2$/g, and an oil absorption (DBP) of 300-500 ml/100 g; and
    D. 0.05-0.2 wt % crosslinking catalyst.

2. The composition of claim 1 in which the thermoplastic composition has a stable volume resistivity of less than 500 ohm-cm at 90° C.

3. The composition of claim 1 in which the silane-functionalized polyethylene is a silane-functionalized ethylene/α-olefin interpolymer having a α-olefin content of 15 to 50 wt % based on the weight of the interpolymer.

4. The composition of claim 1 in which the silane functionality of the polyethylene comprises at least 0.5 wt % of the total weight of the polyethylene.

5. The composition of claim 1 in which the organopolysiloxane is of the formula R$_2$SiO in which each R is independently selected from a group consisting of alkyl radicals comprising one to 12 carbon atoms, alkenyl radicals comprising two to 12 carbon atoms, aryls, and fluorine substituted alkyl radicals comprising one to 12 carbon atoms.

6. A process for making a crosslinked, semiconductive, thermoplastic article having a stable volume resistivity of less than 1000 ohm-cm at 90° C., the process comprising the steps of:
    A. Combining a silane-functionalized polyethylene with an organopolysiloxane containing two or more functional end groups to form a crosslinkable compound;
    B. Combining under ambient conditions (1) the crosslinkable compound of (A) with, (2) carbon black having an average particle size of 50 nm or less, a surface area (BET) of 700-1250 m$^2$/g, and an oil absorption (DBP) of 300-500 ml/100 g, to form a first mixture comprising 80-90 wt % of the crosslinkable compound of (A) and 10-20 wt % of the carbon black, based on the weight of the first mixture;
    C. Combining the first mixture with 0.05-0.2 wt % of a crosslinking catalyst to form a homogeneous second mixture;
    D. Shaping the second mixture under non-crosslinking conditions into a crosslinkable, semiconductive, thermoplastic article; and
    E. Subjecting the shaped, crosslinkable, semiconductive, thermoplastic article to crosslinking conditions.

7. The process of claim 6 comprising the additional step of pelletizing the crosslinkable compound of (A) before mixing it with the organopolysiloxane.

8. The process of claim 6 in which the catalyst is added as a pre-mixed masterbatch.

9. A pellet comprising:
A. 60-90 wt % silane-functionalized polyethylene;
B. 0.5-20 wt % organopolysiloxane containing two or more functional end groups; and
C. 10-20 wt % high conductivity carbon black having an average particle size of 50 nm or less, a surface area (BET) of 700-1250 $m^2/g$, and an oil absorption (DBP) of 300-500 ml/100 g.

* * * * *